Oct. 24, 1944.　　　A. J. CHERRY　　　2,360,826
SELF-LOCKING SCREW OR BOLT
Filed Feb. 23, 1939
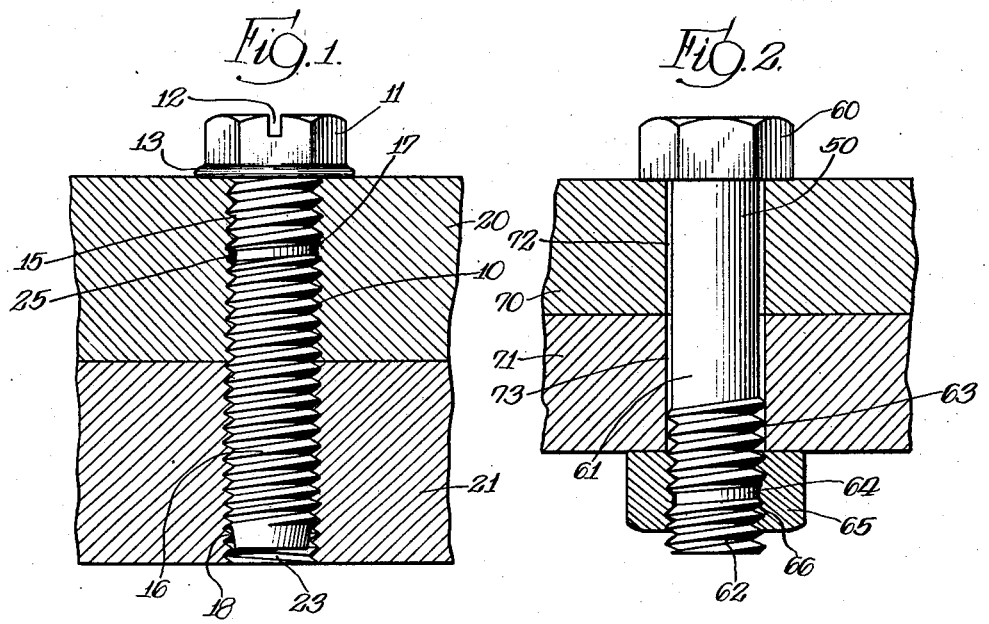
INVENTOR.
Andrew J. Cherry,
BY Wilkinson, Huxley, Byron v Knight
ATTORNEYS.

Patented Oct. 24, 1944

2,360,826

UNITED STATES PATENT OFFICE 2,360,826

SELF-LOCKING SCREW OR BOLT

Andrew J. Cherry, Chicago, Ill., assignor to Economy Screw Corporation, Chicago, Ill., a corporation of Illinois Application February 23, 1939, Serial No. 257,801

8 Claims. (Cl. 151—1)

This invention relates to improvements in threaded devices such as screws, bolts and the like, and more specifically to novel locking means for holding the screw or bolt in fixed association with the part or member with which it may have threaded engagement.

In one form of this invention, the screw or bolt is equipped with two threaded portions of different pitch or size of thread, separated by a portion in which the threads are removed or diminished so as to provide a space or groove for receiving metal forced therein by the action of the threads, whereby the screw or bolt is held against accidental displacement with respect to the threaded portion with which it is associated.

It is an object or this invention to provide a new and self locking screw, bolt or like threaded member which is of simple construction and which may be manufactured at relatively low cost and yet which will perform well in practice.

It is a further object of this invention to provide a process by which self locking screws and bolts of the above type may be made by means of thread-rolling dies.

Other objects not specifically enumerated for this invention will readily appear to one skilled in the art as the following description proceeds.

In the drawing—

Figure 1 is an elevational view, partly in cross section, illustrating a machine screw constructed in accordance with this invention.

Figure 2 is an elevational view, partly in cross section, of a bolt and nut constructed in accordance with this invention.

By referring to the drawing, it will be noted that the screw illustrated in Figure 1 comprises a shank portion 10 and a head portion 11 of usual construction. The head may be straight sided as shown, and it may also have a tool-receiving slot 12 in the upper face thereof. In this particular form of the invention, a circular flange member 13 is provided at the base of the head to serve in a capacity similar to that of a washer.

The shank of the screw comprises an upper threaded part 15 and a lower threaded part 16, separated by a portion or groove 17 in which the screw threads are removed. The lower portion 18 of the screw may be diminished so as to be slightly tapered, whereby it may be more easily started into a threaded opening, or, if desired, may be used as a self-tapping screw. In all events, the upper portion 15 is provided with threads of slightly greater pitch or of somewhat greater size than the threads throughout the lower portion 16.

As shown in Figure 1, if this screw is to be utilized for holding two parts together, such as the members 20 and 21, respectively, these members may be equipped with threaded openings to accommodate the screw, and which may have an internal thread 23 formed therein by any suitable threading instrument. When the openings are threaded, however, the threads are such as to accommodate the threads of the lower portion 16 of the screw in the usual manner, so that upon turning the screw into the threaded openings, the screw will advance relatively freely in the usual manner down to the point where the upper screw threads 15 start to engage the threads of the opening. It will be noted that the portion 17 is placed relatively near the top of the screw so that the greater resistance offered by the bigger threads on the upper portion 15 is not exerted during a very large portion of the turning movement required to completely seat the screw.

After the threads 15 engage with the threads of the opening, the screw, by additional force, is further turned into the opening, notwithstanding the fact that the larger or steeper pitched threads are engaging upon the smaller threads of the opening. The difference in the pitch or size of the threads is so selected, however, that the screw can be turned into the opening by the usual operation in a practical and simple manner, but with the result that the larger threads of the screw displace a certain amount of metal of the female threads. This action causes a ring or wave of metal to be formed on the inner surface of the opening just ahead of the threads on the upper portion 15. This ring or wave of metal increases as the screw cuts further and further into the opening, whereby at the time that the screw is fully seated a sufficient ring of metal has been formed on the inner surface of the opening to occupy and substantially fill the space or groove provided at the portion 17. As above pointed out, this space or groove is provided by omitting the threads for a short distance on the shank of the screw at the location between the upper and lower threaded portions. This ring of holding metal is shown at 25 in Figure 1, wherein it will be noted that it is represented as occupying the space at the portion 17 so that the screw is firmly held against accidental displacement not only by the friction of the larger male threads engaging the smaller female threads but also by the ring of metal which is firmly locked in the space or groove 17.

The applicant is aware of the fact that various lock nuts and screws have been provided which depend upon the interengagement of threaded parts having threads of different pitch or threads of different size at one portion as compared with another portion, with the result that a certain frictional or binding action results when the parts are screwed together, but the applicant does not make any claim to the use of such frictional holding means alone. On the contrary, the invention here, in addition, depends upon the holding ring above described, produced by the larger male threads cutting into the smaller female threads so as to create or form a wave of metal in advance of the leading edge of the larger threads as the screw is turned to its seated position, and upon this ring of metal as constituting a firm holding means occupying the space or groove 17 provided in the screw between the upper and lower threaded portions. It is to be understood that the screw may have a hardened surface so that the threads of the upper portion 15 are harder than the female threads of the opening, or nut, or part into which it is threaded, whereby the displacement of the metal to form the holding ring, as above described, is satisfactorily accomplished.

As shown in Figure 2, the invention is embodied in a bolt 50 having a straight sided head 60 and a shank portion 61. The lower end of the shank portion is provided with screw threads comprising threads 62 at the end and 63 upward from the end, and a central space or groove 64 corresponding to the space 17 on the screw shown in Figure 1.

In association with the bolt 50 is a nut 65 which is provided with a female thread 66 of pitch and size adapted to cooperate with the lower threads 62 on the bolt. In this illustration, the bolt is shown in holding association with parts 70 and 71 which are equipped with aligned openings 72 and 73, respectively, adapted to receive and accommodate the bolt 50. In this case, the threaded part of the bolt will have its upper threads 63 of larger size or greater pitch than the threads of the lower part 62, and at least the upper threads will be hardened or constructed of harder material than the nut 65.

In use, the bolt is inserted through the openings 72 and 73 with its end projecting in the manner shown, and thereupon the nut 65 is applied to the threaded end thereof. The threads of the nut will turn relatively freely when in engagement with the end 62 of the bolt, but after reaching the larger threads above the space 64 an increased friction results, due to the binding of the larger male threads upon the smaller female threads of the nut. By continuing the onward turning movement of the nut, the larger male threads of the bolt, due to the fact that they are harder than the smaller female threads of the nut, will cut their way into the nut and will displace at the leading edge of the larger thread a ring or wave of metal which, when the nut is all the way home, will be sufficient to occupy and exert a substantial holding action within the annular space 64 of the bolt.

Here, the nut is locked onto the bolt to some extent by the frictional action of the larger threads in the smaller female threads, but primarily by the holding ring of metal displaced from the female threads occupying the annular space 64 on the shank of the bolt.

It is important in practicing this invention to take into account the amount of movement that the screw or nut will have after the initial engagement of the larger male threads with the smaller female threads, for the reason that enough metal must be displaced to form a ring of sufficient size to exert the necessary holding action in the groove or annular space provided in the screw or bolt, while at the same time avoiding an excessive amount of metal.

A further important feature is that the screw or bolt may, by deliberately forcing the same in the unscrewing direction, be removed from its seated position, and by continuing the unscrewing thereof the retraction of the larger and smaller threads will cause the metal which constitutes the holding ring to be once more returned to approximately its original condition, so that the threads of original size are once more established in the nut or screw receiving opening. In this way, screws, bolts and nuts may be used over and over again within limits without destroying the usefulness thereof.

If the screw or bolt has been removed, it may again be driven into seated position and once again the ring of holding metal will be formed in engagement with the groove or space on the screw or bolt.

In the case of the bolt shown in Figure 2, it is necessary to so locate the groove 64 that it will in the final instance be disposed within the confines of the nut. The disposition of this groove is preferably in the middle region of the height of the nut, substantially as shown, so that the holding ring will have a firm engagement with the interior surface of the nut.

This somewhat predetermined location of the groove or space will require, in many instances, the manufacture of bolts of predetermined size in relation to the parts to be held thereby, in order that the space between the head of the bolt and the inner surface of the nut will be occupied by the material therebetween, in such manner that the groove is disposed in the proper relationship to the inner surface of the nut. Of course, certain variations may be effected within limits by means of washers and other spacing means to make the nut come to the proper position, but it will be preferable to select a bolt of such length that the use of spacing means will not be necessary.

This invention contemplates the formation of a bolt of the type shown in Figure 2, in which a series of grooves or annular spaces, such as 64, may be provided at spaced intervals throughout the length of the shank of the bolt. In each case, however, each successive threaded portion will necessarily have threads of increased size or greater pitch than the portion below, and nuts of different sizes will be required according to the particular holding groove that is utilized in the final holding action. In each case a nut which fits the lower half of the threaded surface which is utilized will be employed, and in such event the next adjacent upper portion of the bolt will present the enlarged male threads for cutting into the nut in the manner previously described.

This invention may be practiced by utilizing screw threads of different pitch or of different size, the essential characteristic being that the threads which engage last, as the bolt or screw enters the threaded opening, shall have greater volume or displacement than the screws first to engage in the opening. Due to the greater displacement, the threads which enter last more than fill the female threads of the opening, whereby the metal thereof is displaced in the manner previously described and caused to fill the locking groove. It should, therefore, be understood that any character of threads is contemplated wherein the threads last to enter have a greater displacement than the threads which enter first.

It will be further apparent from an understanding of this invention that the screws and bolts are very efficient and economical and yet at the same time may be made by a very simple and inexpensive manufacturing operation.

The foregoing is to be regarded merely as illustrative of this invention and not as limiting the same in any respect. The scope of this invention is to be determined solely from the appended claims.

What is claimed is:

1. A self-locking screw-threaded member adapted to cooperate with an associated screw threaded member and having a shank, screw threads on said shank and a material receiving groove in said shank above said screw threads, and a portion on said shank above said groove and of an outside dimension sufficient to displace material of said associated screw threaded member and to cause said material to form a holding rib disposed in said groove as said screw threaded member is advanced in relation to its associated screw threaded member.

2. A self-locking screw threaded member of the character defined in claim 1 further characterized in that said portion on said shank above said groove is provided with an enlarged screw-thread.

3. A self-locking screw threaded member of the character defined in claim 1 further characterized in that said portion on said shank above said groove is provided with an enlarged screw-thread of the same hand.

4. A self-locking screw threaded member of the character defined in claim 1 further characterized in that said portion on said shank above said groove is provided with a screw-thread of greater pitch.

5. A self-locking screw threaded member of the character defined in claim 1 further characterized in that said groove extends circumferentially around the waist of said shank.

6. A self-locking screw threaded member of the character defined in claim 1 further characterized in that said groove is of such size as to become substantially completely filled by said holding rib when said screw threaded member is in final locked position.

7. A self-locking screw threaded member of the character defined in claim 1 further characterized in that said portion on said shank above said groove is hardened to a degree greater than the hardness of said associated screw threaded member.

8. A self-locking screw threaded member of the character defined in claim 1 further characterized in that said portion on said shank above said groove is provided with an enlarged screw thread which is hardened to a degree greater than the hardness of said associated screw threaded member.

ANDREW J. CHERRY.